United States Patent [19]

Raab et al.

[11] 4,291,725

[45] Sep. 29, 1981

[54] FLUID CONTROL SWITCHES

[75] Inventors: Andrew F. Raab, Morton Grove; Raymond T. Halsted, Wheeling, both of Ill.

[73] Assignee: Indak Manufacturing Corp., Northbrook, Ill.

[21] Appl. No.: 73,011

[22] Filed: Sep. 6, 1979

Related U.S. Application Data

[62] Division of Ser. No. 893,831, Apr. 6, 1978.

[51] Int. Cl.[3] .............................................. F16K 11/06

[52] U.S. Cl. ................................ 137/625.25; 137/353

[58] Field of Search ................... 137/625.25, 106, 105, 137/104, 103, 625.48, 625.21

[56] References Cited

U.S. PATENT DOCUMENTS

| | | | |
|---|---|---|---|
| 2,071,204 | 2/1937 | Hunt | 137/625.25 X |
| 2,489,563 | 11/1949 | Denesen | 137/105 |
| 2,966,032 | 12/1960 | Weymouth . | |
| 3,595,274 | 7/1971 | Farsandier | 137/625.25 |
| 3,637,961 | 1/1972 | Fiddler et al. . | |
| 3,637,962 | 1/1972 | Fiddler et al. . | |
| 3,824,356 | 7/1974 | Fiddler et al. . | |
| 3,845,257 | 10/1974 | Fiddler et al. . | |
| 3,906,178 | 9/1975 | Fiddler et al. . | |
| 3,942,555 | 3/1976 | Raab et al. . | |
| 4,054,761 | 10/1977 | Raab et al. . | |
| 4,126,153 | 11/1978 | Raab . | |

*Primary Examiner*—Alan Cohan

*Attorney, Agent, or Firm*—Burmeister, York, Palmatier, Hamby & Jones

[57] ABSTRACT

A combined electrical and fluid control switch is disclosed, comprising a casing, at least one operating carriage movable in the casing, and valve means in the casing and operable by the movement of the carriage. The valve means may comprise a valve wall along which a control member is movable. The valve wall is formed with at least one vacuum supply port and at least one vacuum utilization port. The control member includes a sealing member having first and second sealing dam enclosures which provide a double seal to prevent leakage between the atmosphere and the vacuum supply port as the control member is moved between a first position in which the support port and the utilization port are connected together, and a second position in which the utilization port is connected to the atmosphere. Each port preferably has a tapered portion at the intersection between the port and the valve wall.

1 Claim, 44 Drawing Figures

FIG. 15
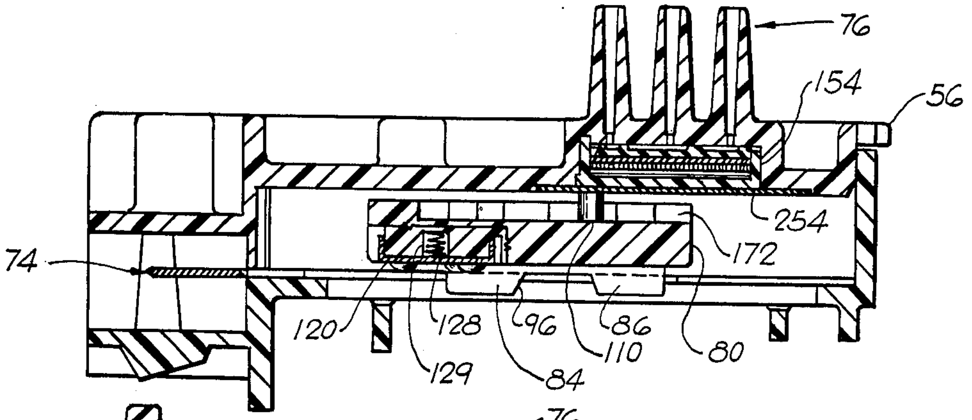
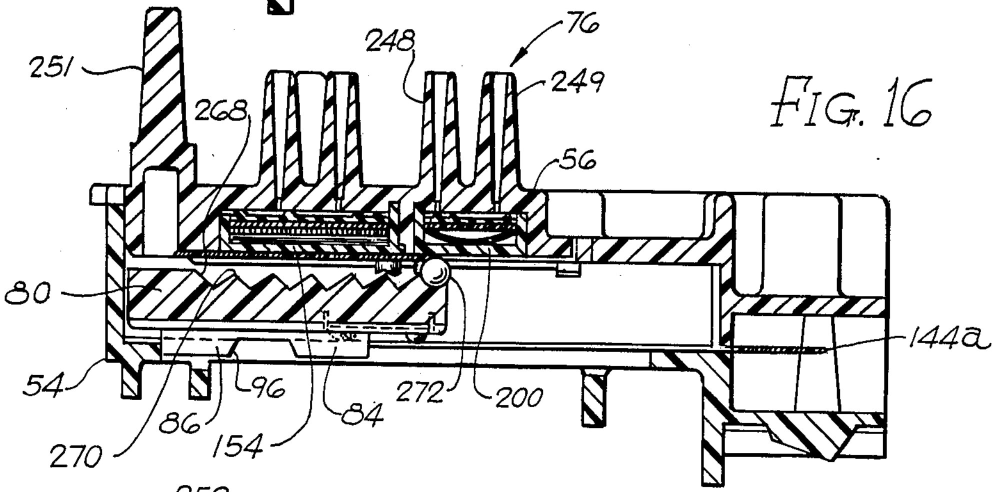
FIG. 16
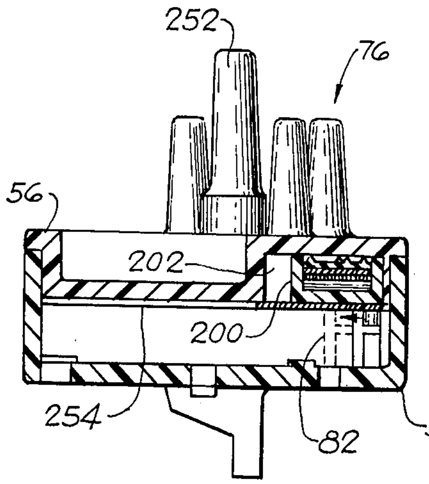
FIG. 17
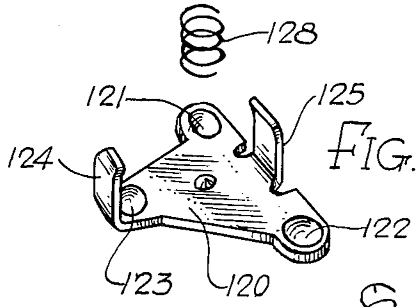
FIG. 18
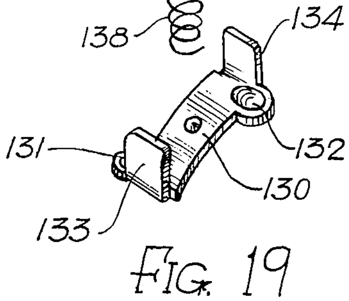
FIG. 19

FIG. 33
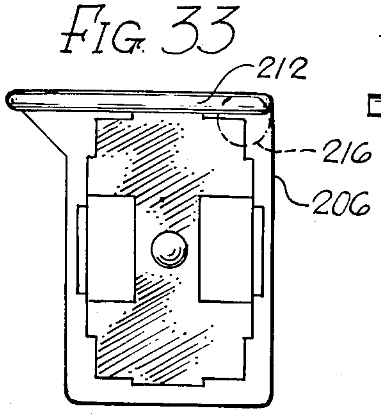
FIG. 34
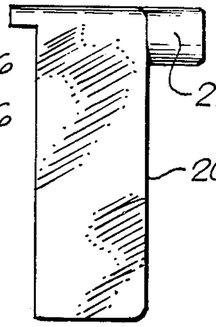
FIG. 35
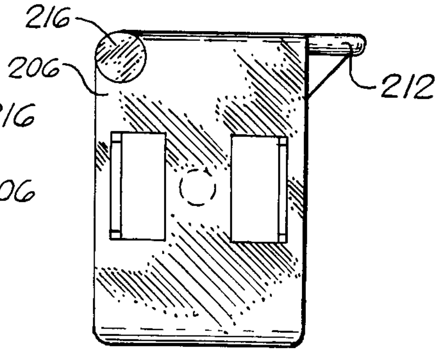
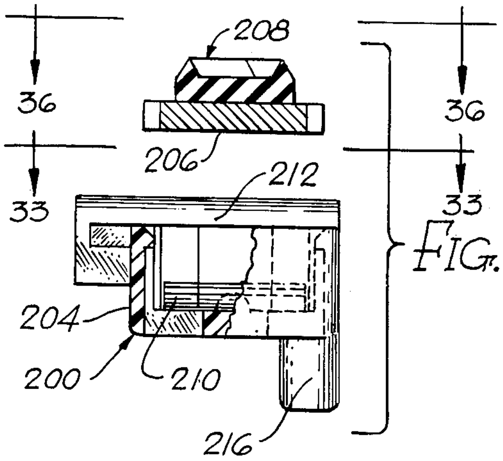
FIG. 32
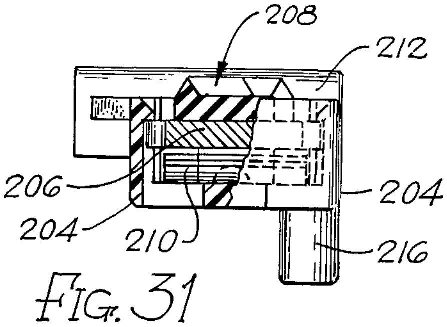
FIG. 31
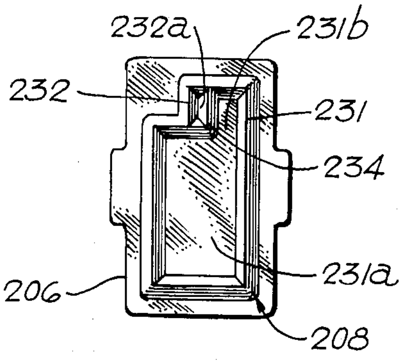
FIG. 36
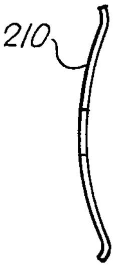
FIG. 38
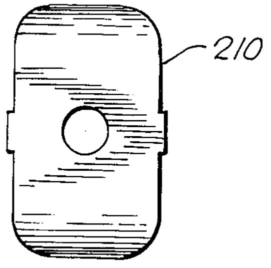
FIG. 37

FIG. 40
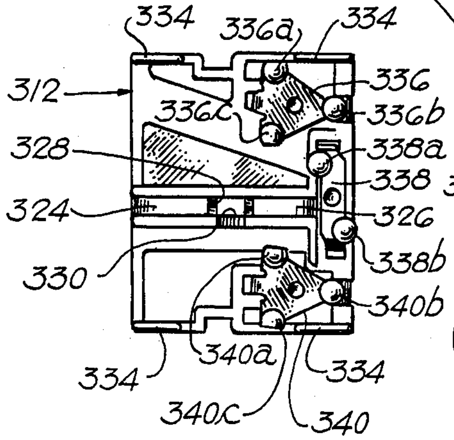
FIG. 39
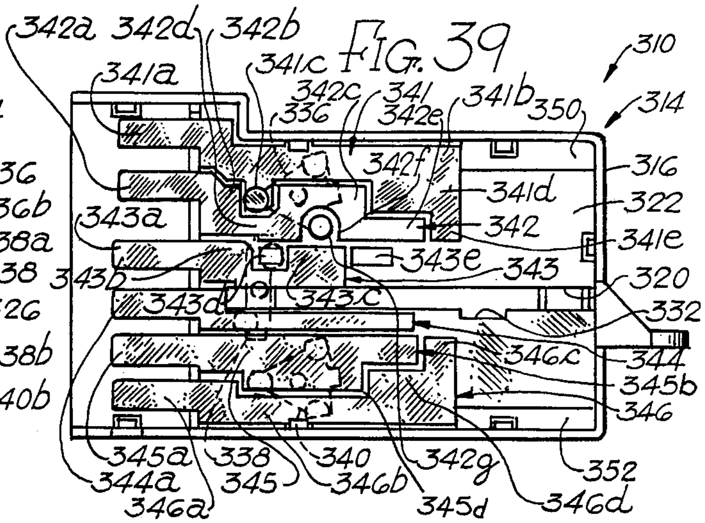
FIG. 41
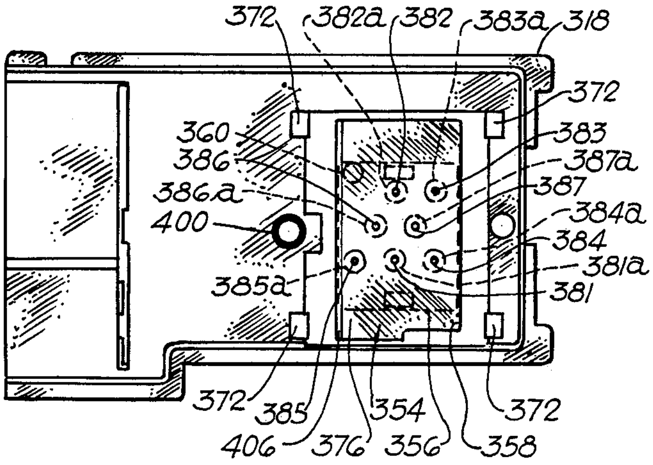
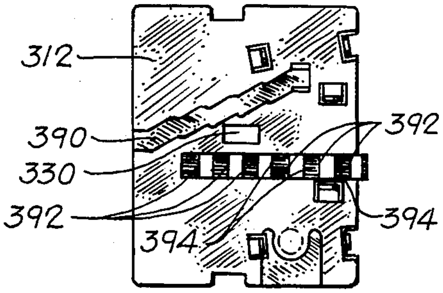
FIG. 44
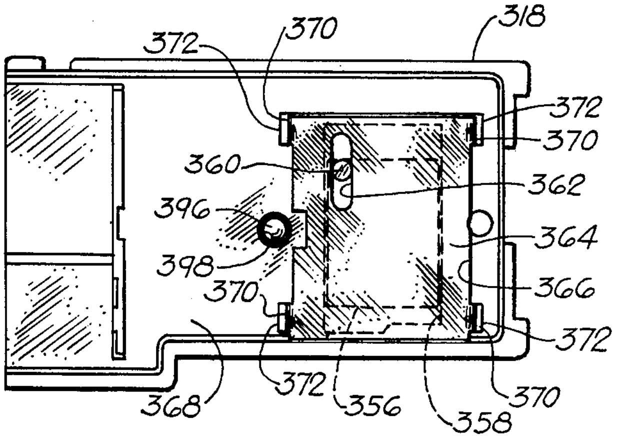
FIG. 43

FLUID CONTROL SWITCHES

This application is a division of our co-pending application, Ser. No. 893,831, filed Apr. 6, 1978.

FIELD OF THE INVENTION

This invention relates to fluid control switches, which will find many applications, but are particularly advantageous for use in connection with heating and air conditioning systems for automobiles and other automotive vehicles.

OBJECTS OF THE INVENTION

One object of the present invention is to provide a new and improved switch of the foregoing character, having fluid control valve means for operating such components as air deflector doors and a heat control valve.

A further object is to provide such a new and improved switch which is operable to a plurality of positions and which is capable of controlling several different functions with a high degree of reliability and precision.

Another object is to provide such a new and improved switch which incorporates a vacuum control valve having means for preventing leakage between the atmosphere and the vacuum source when the valve is being moved between its control positions.

A further object is to provide such a new and improved switch which is rugged and dependable, yet is low in cost.

SUMMARY OF THE INVENTION

To achieve these objectives, the present invention may provide a valve means which may comprise a valve wall having a vacuum supply port and a vacuum utilization port therein, means for connecting a source of vacuum to the vacuum supply port, a valve control member movable along such valve wall, and means guiding such control member for movement along a predetermined path along such wall between first and second positions, the control member having a sealing member engaging such valve wall, such sealing member having a first sealing enclosure dam for enclosing and sealing the vacuum supply port when the control member is in its first position, the vacuum utilization port being outside the first sealing enclosure dam and being open to the atmosphere when the control member is in its first position, the first sealing enclosure dam being movable with the valve control member to enclose the vacuum utilization port as well as the vacuum supply port when the control member is in its second position whereby the utilization port is connected to the supply port, the control member having an intermediate transitional position between the first and second positions, the sealing member having a second sealing enclosure dam enclosing the vacuum utilization port when the control member is in such intermediate position, the vacuum supply port being enclosed by the first enclosure dam when the control member is in such intermediate position, whereby the first and second sealing enclosure dams provide a double seal to prevent any leakage between the atmosphere and the vacuum supply port when the control member is moved between its first and second positions.

Each of the valve ports preferably comprises an opening having a tapered portion at the intersection between such opening and the valve wall, to avoid the formation of any burr at such intersection. Such tapered portion may taper gradually or may be in the form of an angular chamfer at such intersection.

BRIEF DESCRIPTION OF THE DRAWINGS

Further objects, advantages and features of the present invention will appear from the following description, taken with the accompanying drawings, in which:

FIG. 15 is a longitudinal section through the switch, taken generally along the line 15—15 in FIG. 5.

FIG. 16 is a different longitudinal section, taken generally along the broken line 16—16 in FIG. 5.

FIG. 17 is a transverse section, taken generally along the line 17—17 in FIG. 5.

FIG. 18 is a perspective view showing one of the electrical contactors for the switch, along with its contactor spring.

FIG. 19 is a perspective view showing the other electrical contactor for the switch, along with its contactor spring.

FIG. 31 is an edge view, partly in section, of the second valve member for the switch.

FIG. 32 is a view similar to FIG. 31, but with the valve member partially disassembled.

FIG. 33 is a rear view of the second valve carriage, taken as indicated by the line 33—33 in FIG. 32.

FIGS. 34 and 35 are side and front views of the second valve carriage.

FIG. 36 is a rear view of the second valve sealing member, taken as indicated by the line 36—36 in FIG. 32.

FIG. 37 is a view showing the opposite or inner side of the second valve sealing member.

FIG. 38 is an edge view of the second valve pressure spring.

FIG. 39 is a rear view of the front casing assembly of a modified switch.

FIG. 40 is a front view of a modified control carriage for the modified switch.

FIG. 41 is a front view of the rear casing component of the modified switch, the movable valve member being shown in broken lines.

FIG. 43 is a front view of the rear casing assembly for the modified switch.

FIG. 44 is a rear view of the control carriage for the modified switch.

DESCRIPTION OF PREFERRED EMBODIMENTS

Figure 2:
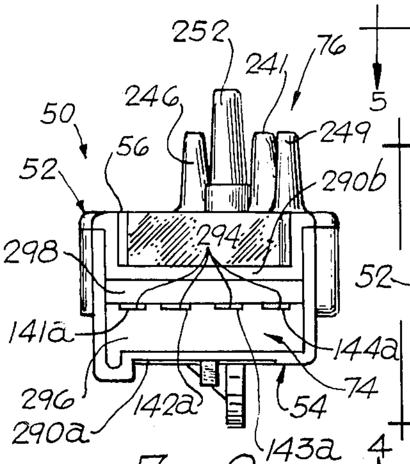
FIGS. 2 and 3 are opposite end views of the switch, taken as indicated by the lines 2—2 and 3—3 in FIG. 1.

An illustrative embodiment of the present invention is shown in FIGS. 1—39, in the form of a combined electrical and fluid control switch 50, shown generally in FIGS. 1-5. The switch 50 comprises a casing 52, which in this case has front and rear components 54 and 56, adapted to fit together with a snap lock. In this case, the switch 50 is adapted to be operated by one or more external members, each of which may take the form of a lever 58, shown in broken lines in FIG. 1. The lever 58 is swingable about a pivot 60 and is provided with lever arms 62 and 64. The lever arm 62 preferably extends to a location where such lever arm will be manually operable. The other lever arm 64 preferably extends into the casing 52 to operate the switch 50. The front component 54 of the casing 52 may be formed with two elongated slots 66 and 68, adapted to receive two such lever arms 64.

As illustrated, the front component 54 of the casing 52 is formed with apertured bracket flanges 70 and 72, for use in mounting the switch 50 on a supporting frame or the like. The switch 50 has electrical terminal means 74, adapted to receive an electrical connector for connecting electrical circuits to the switch 50. It will be seen that the switch 50 also has fluid terminal means 76, for receiving a fluid transmitting connector, whereby a source of a working fluid and a plurality of fluid utilization devices may be connected to the switch 50. Additional details of the electrical terminal means 74 and the fluid terminal means 76 will be described presently.

Figures 6, 7, 8, 9, 10, 11, 12, 13, 14:
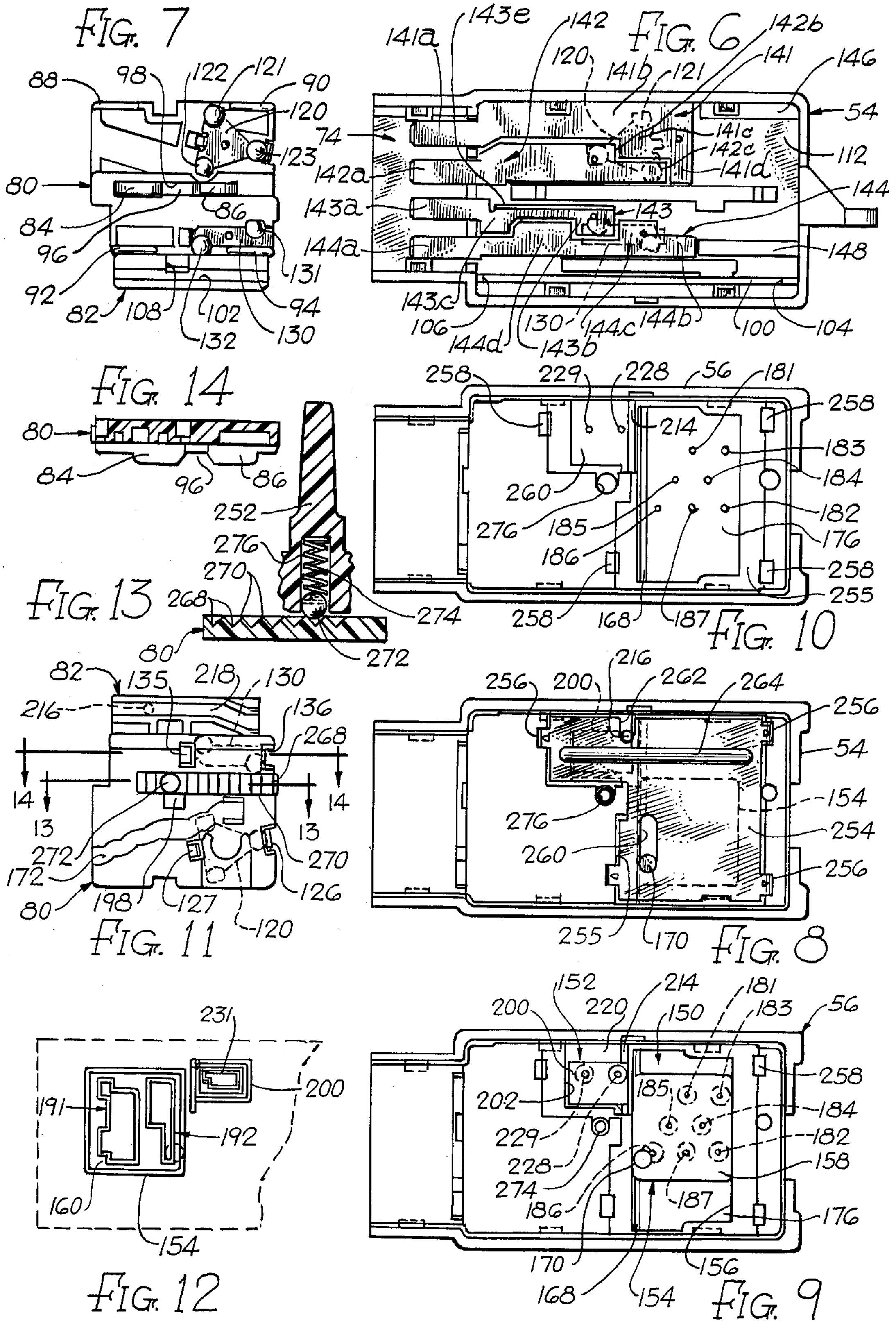
FIG. 6 is a rear view of the front casing assembly for the switch, with the rear casing assembly and the operating carriages removed.
FIG. 7 is a front view of the operating carriages for the switch.
FIG. 8 is a front view of the rear casing assembly for the switch.
FIG. 9 is a view similar to FIG. 8, but with the valve cover plate removed.
FIG. 10 is a view similar to FIG. 9, but with the valve control members removed.
FIG. 11 is a rear view of the operating carriages for the switch.
FIG. 12 is a rear view of the valve control members for the switch.
FIGS. 13 and 14 are sectional views through the function control carriage, taken generally along the lines 13—13 and 14—14 in FIG. 11.
Figure 24:
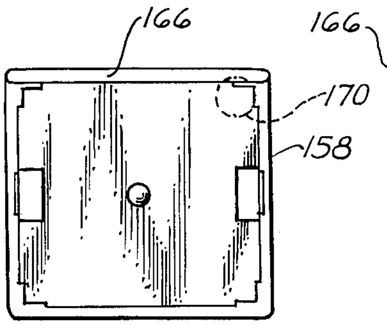
FIG. 24 is a rear elevation of the valve carriage, taken as indicated by the line 24—24 in FIG. 23.
Figure 25:
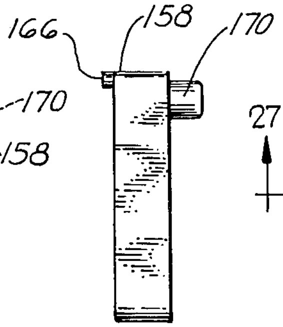
FIGS. 25 and 26 are side and front views of the valve carriage.
Figure 26:
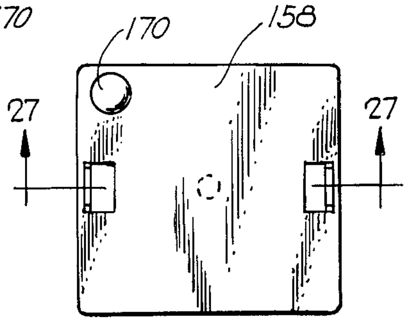
Figure 28:
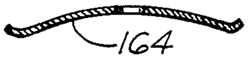
FIG. 28 is a section taken through the valve pressure spring.
Figure 29:
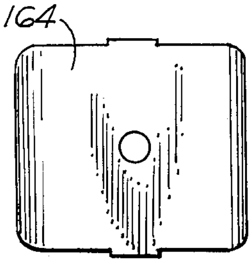
FIG. 29 is an elevation showing the inner side of the backing plate for the valve sealing member.
Figure 27:
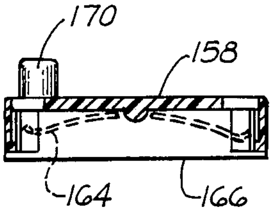
FIG. 27 is a section taken through the valve carriage, generally along the line 27—27 in FIG. 26.
Figure 23:
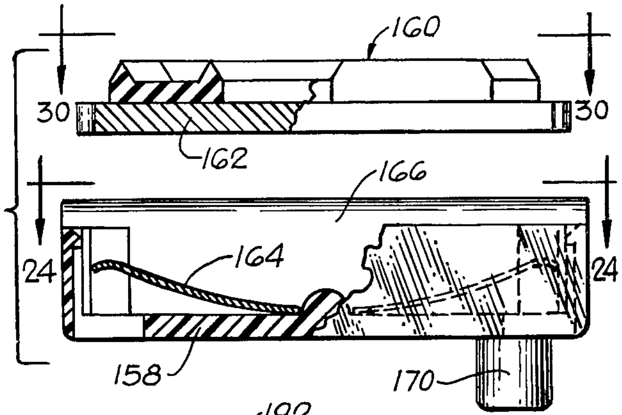
FIG. 23 is a view similar to FIG. 22, but with the valve member partially disassembled.
Figure 22:
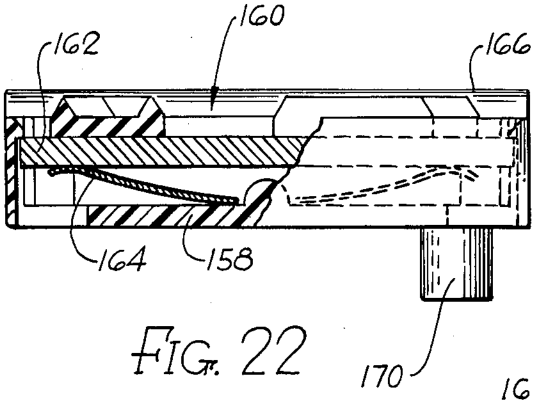
FIG. 22 is an enlarged edge view, partly in section, showing one of the valve member assemblies for the switch.
Figure 30:
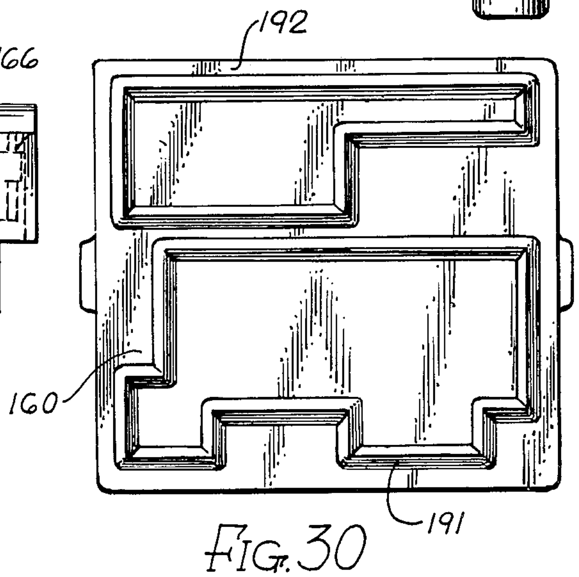
FIG. 30 is a rear view of the valve sealing member.

As shown in FIGS. 6-14, the switch 50 may be provided with one or more operating carriages which are movable within the casing 52, two such carriages 80 and 82 being shown in FIGS. 7 and 11. These carriages 80 and 82 will be referred to as the "function carriage" and the "temperature carriage".

The illustrated switch 50 will find many applications, but is particularly well adapted for controlling the heating and air-conditioning system of an automobile or some other automotive vehicle. In such service, the movement of the function carriage 80 controls the operation of a blower motor, an air-conditioning clutch, and various fluid powerdevices for operating doors and diverters in the air circulating system. The movement of the temperature carriage 82 controls the supply of heat to the air circulating system.

The illustrated function control carriage 80 has at least one and preferably two guide tabs or flanges 84 and 86 which are slidably received in the guide slot 66, so that the carriage 80 will be movable along a predetermined path in the casing 52. The slot 66 and the guide tabs 84 and 86 are preferably of a generally rectangular shape, and are fitted together with a fairly close sliding fit so that the movement of the function carriage 80 will be maintained in alignment with the guide slot 66. The illustrated function carriage 80 is also provided with four forwardly projecting guide runners 88, 90, 92 and 94 which are slidable within the front component 54 of the casing 52.

To receive the external lever arm 64, a gap 96 is formed between the guide tabs 84 and 86. A slot 98 extends through the carriage 80 in alignment with the gap 96.

As shown in FIGS. 6 and 7, the temperature carriage 82 is guided by a longitudinal flange or ridge 100 (FIG. 6), projecting rearwardly from the front casing component 54. The temperature carriage 82 is formed with a longitudinal groove or channel 102 (FIG. 7) for slidably receiving the flange 100 with a fairly close sliding fit, so that the carriage 82 is maintained in alignment with the flange 100. Rearwardly projecting stops 104 and 106 are formed near the opposite ends of the flange 100 to limit the longitudinal sliding movement of the temperature carriage 82. The guide flange 100 is parallel with the slot 68. It will be seen that the temperature carriage 82 is formed with a slot or gap 108 which is aligned with the entry slot 68 and is adapted to receive an external operating member, such as one of the lever arms 64.

Figure 4:
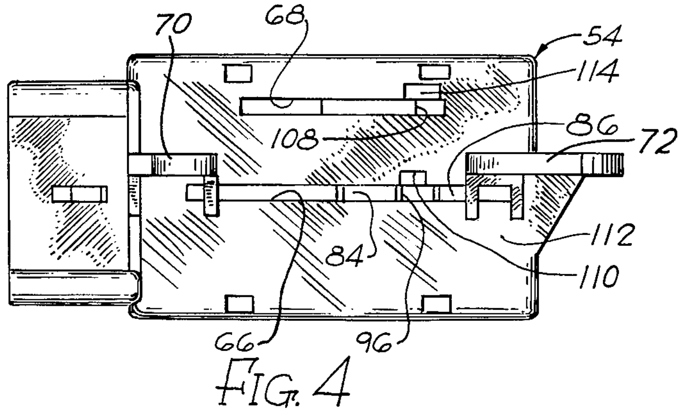
FIGS. 4 and 5 are front and rear side views of the switch, taken as indicated by the lines 4—4 and 5—5 in FIG. 1.

It will be seen from FIG. 4 that a notch 110 is formed in the front wall 122 of the front casing component 54, connecting with the guide slot 66 and constituting a widened portion thereof. The notch 110 facilitates the insertion of an external operating member, such as one of the lever arms 64, into the guide slot 66, particularly when the switch 50 is mounted in a situation in which there is very limited clearance for the insertion of the lever arm 64. For such insertion, the function carriage 80 is preferably moved to a position where the gap 96 between the tabs 84 and 86 is aligned with the notch 110.

Similarly, a notch 114 is preferably formed in the front wall 112 along the guide slot 68, to form a widened portion thereof, for the insertion of an external operating member, such as one of the lever arms 64. For such insertion, the temperature carriage 84 is preferably moved to a position in which the slot 108 is aligned with the notch 114.

The movable function carriage 80 is adapted to operate switching means in the casing 52. Such switching means may assume various forms. In this case, the function carriage 80 is provided with one or more contactors which are engageable with fixed contact means on the front component 54 of the casing 52. More specifically, the switching means may comprise a three point contactor 120 which is mounted on the rear side of the function carriage 80 and is movable with such carriage.

The illustrated contactor 120 is generally triangular in shape and is formed with three forwardly projecting contact points 121, 122 and 123, as shown in FIGS. 6 and 7. The contact points 121, 122 and 123 may be spherically rounded in shape. The contactor 120 is retained on the carriage 80 by guide tabs 124 and 125 which project rearwardly from the contactor 120 and are slidably received in slots 126 and 127, formed in the carriage 80, as shown in FIGS. 7, 11 and 18. The contactor 120 is resiliently biased against the fixed contact means, preferably by a coil spring 128, which is compressed between the contactor 120 and the carriage 80 and is preferably received in a socket or recess 129 in the carriage, as shown in FIG. 15.

In this case, the function carriage 80 is also provided with a second contactor 130 having two forwardly projecting contact points 131 and 132 which may be spherically rounded. See FIGS. 7, 11, 16 and 19. To retain the contactor 130 on the carriage 80, the contactor 130 has guide tabs 133 and 134 which are slidably received in slots 135 and 136, formed in the carriage 80. The contactor 130 is resiliently biased against the fixed contact means by a coil spring 138, compressed between the carriage 80 and the contactor 130.

The electrical contactors 120 and 130 may be made of copper or some other suitable electrically conductive material. The carriage 80 may be made of an electrically insulating material, such as a resinous plastic material, which is resistant to heat.

FIG. 6 illustrates the fixed electrical contact means which are engageable by the electrical contactors 120 and 130. In this case, there are four fixed electrical contacts in the form of bars or strips 141, 142, 143 and 144, mounted on the front casing component 54. The contact bars 141–144 may be riveted or otherwise secured to the rear side of the front wall 112. As shown in FIG. 6, the left hand end portions of the contact bars 141–144 provide the electrical terminal means 74, which may be in the form of lugs or prongs 141*a*, 142*a*, 143*a* and 144*a*, adapted to receive a suitable electrical connector.

The three-point contactor 120 and the contact bars 141 and 142 may be employed to energize and deenergize the blower motor in the automotive heating and air-conditioning system. As shown in FIG. 6, the contact bar 141 has a main longitudinal portion 141*b* which is engaged by the contact point 121 throughout the range of longitudinal movement of the contactor 120. Thus, the contact bar 141 is preferably connected to the battery or some other source of electrical power.

The contact bar 141 has a first wing or tab 141*c* which is engaged by the contact point 123 when the three-point contactor 120 is in its OFF position, displaced to the right from the position shown in broken lines in FIG. 6. In this OFF position, the contact point 122 engages a second wing or tab 141*d*. It will be seen that the first wing 141*c* projects laterally from the right hand portion of the contact bar 141. The second wing 142 projects laterally from the right hand portion of the first wing 141*c*.

When the three-point contactor 120 is moved from its OFF position to its first ON position, as shown in broken lines in FIG. 6, the contact point 123 comes into engagement with a first elongated segment 142*b* of the contact bar 142. At the same time, the contact point 122 comes into engagement with a second segment 142*c* of the contact bar 142. It will be seen that the segments 142*b* and 142*c* are stepped, so that the segment 142*b* is aligned with the first wing 141*c*, while the segment 142*c* is aligned with the second wing 141*d*.

In the movement of the three-point contactor 120 between its OFF and ON positions, the contact points 122 and 123 make and break with the segments 142*c* and 142*b*, substantially simultaneously. This double break action distributes the electrical arcing and the consequent wear between the contact points 122 and 123, so as to prolong the useful life of the contact points and the fixed contact elements 142*b* and 142*c*.

The contact bars 141 and 142 may be made of copper or some other suitable electrically conductive material. To reduce the electrical contact resistance, the contact bars 141 and 142 may be plated with silver or tin.

The front casing component 54 is made of an electrically insulating material, such as a suitable resinous plastic material, which should preferably be highly resistant to the heat which is generated by the electrical currents handled by the electrical switching means. For example, the front casing component 54 may be made of glass filled nylon.

The two-point contactor 130 and the contact bars 143 and 144 may be employed to control the energization of the air-conditioning clutch in the automotive heating and air-conditioning system. The two-point contactor 130 has two ON positions in which the contact point 131 engages two spaced segments or tabs 143*b* and 143*c* on the contact bar 143. In FIG. 6, the contactor 130 is shown in broken lines in its first ON position. The other contact point 132 is engageable throughout its range of movement with the main longitudinal portion 144*b* of the contact bar 144. The two-point contactor 130 has OFF positions in which the contact point 131 engages laterally projecting tabs or segments 144*c* and 144*d* on the contact bar 144. It will be seen that the segment 143*b* extends into the gap between the segments 144*c* and 144*d*. The segment 144*d* extends into the gap between the segments 143*b* and 143*c*. The segments144*c* and 144*d* serve the purpose of keeping the contact point 142 away from the insulating material of the casing wall 112, so that electrical arcing between the contact point 132 and the segments 143*b* and 143*c* is kept away from the insulating material.

The contact bar 143 is preferably formed with a rearwardly projecting flange 143*e* which stiffens and reinforces the contact bar 143.

The runners 88 and 90 on the carriage 80 are adapted to slide along the first contact bar 141. For the right hand portion of the range of movement of the carriage 80, the runner 88 slides on the right hand end of the contact bar 141 and then slides along a ridge or rib 146, projecting rearwardly from the rear side of the casing wall 112. The rib 146 projects by an amount corresponding generally to the thickness of the contact bar 141, so that the rear side of the rib 146 is in substantially the same plane as the rear side of the contact bar 141. Thus, the runner 88 slides smoothly between the contact bar 141 and the rib 146.

Similarly, the runners 92 and 94 on the carriage 80 slide along the contact bar 144. As the runner 92 is moved to the right, it slides off the right hand end of the contact bar 144 and then slides along a rearwardly projecting rib 148 on the casing wall 112. The rib 148 projects by an amount corresponding to the thickness of the contact bar 144, so that the rear sides of the contact bar 144 and the rib 148 are in substantially the same plane. Thus, the runner 92 will slide smoothly between the contact bar 144 and the rib 148.

In addition to operating the electrical switching means, the function or selector carriage 80 operates valve means 150 in the casing 52, as shown in FIGS. 8–12. The temperature carriage 82 operates additional valve means 152. The valve means 150 and 152 connect with the valve terminal means 76. The valve means 150 and 152 may be called the selector valve means and the temperature valve means, respectively. Both of the valve means 150 and 152 are mounted in the rear casing component 56, which may be made of a suitable material, such as a resinous plastic material which is well adapted for precision molding.

As shown in FIG. 9, the selector valve means 150 comprises a movable valve member 154 which is slidable in a slideway or chamber 156, formed in the rear casing component 56.

As detailed in FIGS. 22–30, the selector valve member 154 is an assembly of a plurality of parts, comprising a valve carriage or block 158, a sealing member or slider 160, a backing plate 162 for the sealing member 160, and a pressure spring 164 adapted to be compressed between the carriage 158 and the backing plate 162. The carriage 158 is formed with a rearwardly projecting guide flange 166 which is slidably received in a guide slot or groove 168, formed in the casing member 56 along one side of the slideway 156. The flange 166 and the groove 168 guide the valve carriage 158 for movement in a direction transverse to the movement of the function carriage 80.

Such transverse movement of the valve carriage 158 is brought about by camming means, connected between the function carriage 80 and the valve carriage 158. Thus, the valve carriage 158 is preferably formed with a cam follower, which may be in the form of a pin or lug 170, projecting forwardly from the valve carriage 158. The cam follower 170 engages a cam 172 on the carriage 80, as shown in FIG. 11. The illustrated cam 172 is in the form of a cam groove, which extends in a generally diagonal direction along the rear side of the function carriage 80. To avoid backlash in the camming operation, the cam groove or track 172 has sidewalls which are serrated, or formed alternately with projections and hollows, as disclosed and claimed in the Raab and Cobb U.S. Pat. No. 3,942,555, issued Mar. 9, 1976.

Thus, as the function carriage 80 is moved longitudinally in the casing 52, the cam groove 172 causes transverse movement of the valve carriage 158.

As detailed in FIGS. 22–30, the valve carriage 158 is hollow and is adapted to receive the backing plate 162 for the valve sealing member 160. The backing plate 162 and the sealing member 160 are resiliently biased in a rearward direction by the spring 164, which is shown as a bow or leaf spring. The sealing member 160 may be made of a soft resilient material, such as silicone rubber, for example. The backing plate 162 may be made of a stiff, strong material, such as metal. The sealing member 160 may be cemented or bonded to the plate 162. The valve carriage 158 is made of a suitable material, such as a resinous plastic material.

The valve sealing member 160 is slidable along a flat valve wall 176, forming the rear wall of the slideway 156.

As shown in FIGS. 9 and 10, the valve wall 176 is formed with a plurality of valve ports, adapted to transmit a working fluid. The valve means 150 is especially well adapted for use as a vacuum control valve means. For such service, the working fluid is air, which is sucked in by the vacuum source.

In this case, as illustrated in FIG. 10, the valve wall 176 is formed with seven valve ports 181–187, some of which are vacuum supply ports, while others are vacuum utilization ports. The sealing member 160 has means for selectively connecting the vacuum utilization ports to one of the supply ports, or to the atmosphere. For this purpose, the sealing member 160, as illustrated in FIGS. 12 and 13, is formed with first and second sealing enclosure dams or ridges 191 and 192 which project rearwardly on the sealing member 160. In this case, the first enclosure dam 191 cooperates with the ports 181, 182, 183, 184 and 187, while the second enclosure dam 192 cooperates with the ports 185 and 186. The port 187 is enclosed within the dam 191 in all positions of the sealing member 160, throughout the range of movement of the valve member 154. Thus, the port 187 is adapted to be employed as a vacuum supply port. The ports 181–184 are enclosed by the dam 191 in certain positions of the valve member 154 and are outside the enclosure of the dam 191 in other positions of the valve member. Thus, the ports 181–184 are adapted to serve as vacuum utilization ports, to be connected to various devices which are to be selectively operated by the selector valve means 150.

In the case of the second enclosure dam 192, the port 186 is within the enclosure of the dam in all positions of the sealing member 160, throughout the range of movement of the valve member 154, while the port 185 is selectively connected to the enclosure of the dam 192, or to the atmosphere, by the movement of the valve member 154. Thus, the port 185 may be regarded as a vacuum utilization port.

The temperature control valve means 152 is adapted to be operated by movement of the temperature carriage 82. For this purpose, camming means may be connected between the carriage 82 and the temperature control valve means 152.

From FIG. 9, it will be seen that the temperature control valve means 152 comprises a movable valve member 200 which is transversely slidable in a slideway or chamber 202, formed in the rear casing component 56. As detailed in FIGS. 31–38, the temperature valve member 200 may be an assembly of a plurality of parts, comprising a valve carriage or block 204, a backing plate 206 mounted in the carriage 204, a valve sealing member 208 cemented or bonded to the rear side of the plate 206, and a spring 210 which resiliently biases the sealing member 208 in a rearward direction. The spring 210 is shown as a leaf or bow spring.

The illustrated valve carriage 204 is formed with a rearwardly projecting guide flange 212 which is slidable along a guide slot or groove 214, formed along one edge of the slideway 202 in the casing member 56. The carriage 204 may be made of a suitable material, such as a resinous plastic material. The backing plate 206 is preferably made of metal or some other stiff, strong material. The sealing member 208 is made of a soft resilient material, such as silicone rubber.

To form the camming means for the temperature valve means 152, the carriage 204 is preferably formed with a cam follower in the form of a forwardly projecting pin or lug 216. The temperature carriage 82 is provided with a cam, which is preferably in the form of a cam groove or track 218, adapted to receive the follower 216. For at least a portion of its length, the cam groove 218 extends in a diagonal direction.

The sealing member 208 is slidable along a valve wall 220, forming the rear wall of the slideway 202. In this case, the valve wall 220 is formed with two valve ports 228 and 229, as shown in FIGS. 9 and 10. One of these ports may be regarded as a vacuum supply port, while the other is regarded as a vacuum utilization port. The valve sealing member 208 comprises means for connecting the utilization port to the supply port in at least one position of the valve member 200. In another position, the utilization port may be connected to the atmosphere, while the supply port is sealed. In accordance with a feature of the present invention, the sealing member 208 is provided with a double seal, so that there is no leakage between the atmosphere and the vacuum supply port, when the sealing member 208 is in transit between its two principal positions. Such double seal is provided by first and second sealing enclosure dams or ridges 231 and 232 on the sealing member 208. The first enclosure dam 231 cooperates with the valve wall 220 to enclose a chamber 231*a*. In this case, the valve port 229 is enclosed by the first enclosure dam 231 throughout the range of movement of the temperature valve member 200, so that the port 229 is always in communication with the chamber 231*a*. At one end, the formation of the dam 231 is such that the chamber 231*a* has a portion 231*b* of reduced width. This reduced or narrowed portion 231*b* is in communication with the port 228 when the valve member 200 is moved to one end of its range of movement. When the valve member 200 is moved to the other end of its range of movement, the port 228 is moved out of communication with the narrowed chamber portion 231*b* and into communication with the atmosphere.

At an intermediate position, between the first and second end positions, as mentioned above, the utilization port 228 is enclosed by the second enclosure dam 232, which encloses a chamber 232*a*, which is separated from the narrowed chamber portion 231*b* by a common wall or dam element 234. It will be evident that the second enclosure dam 232 seals the utilization port 228 as the wall or dam element 234 is in transit over the port 228. The second enclosure dam 232 obviates any communication between the atmosphere and the utilization port 228 until the vacuum supply port 229 has been completely sealed by the wall element 234.

Figure 1:
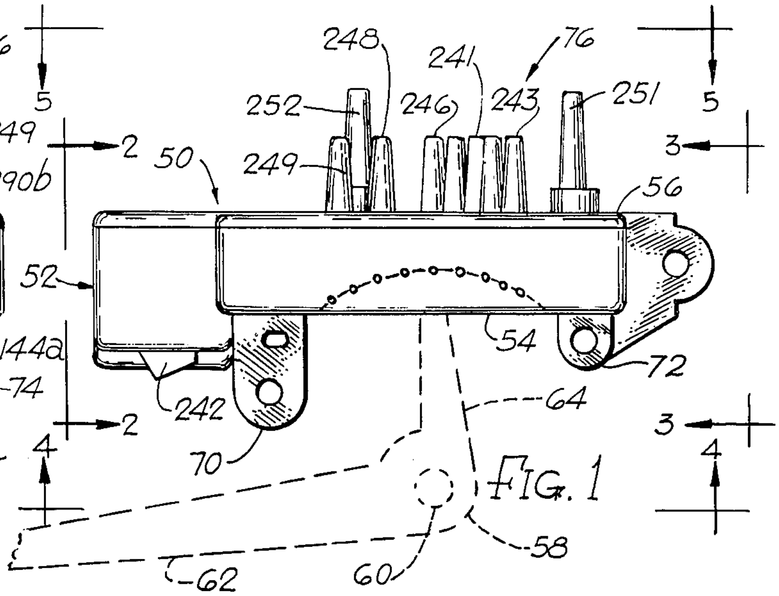
FIG. 1 is a plan view of a combined electrical and fluid control switch, to be described as an illustrative embodiment of the present invention.
Figure 3:
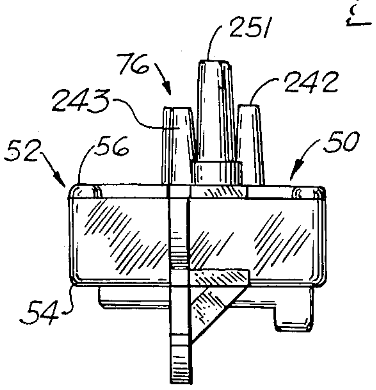
Figure 5:
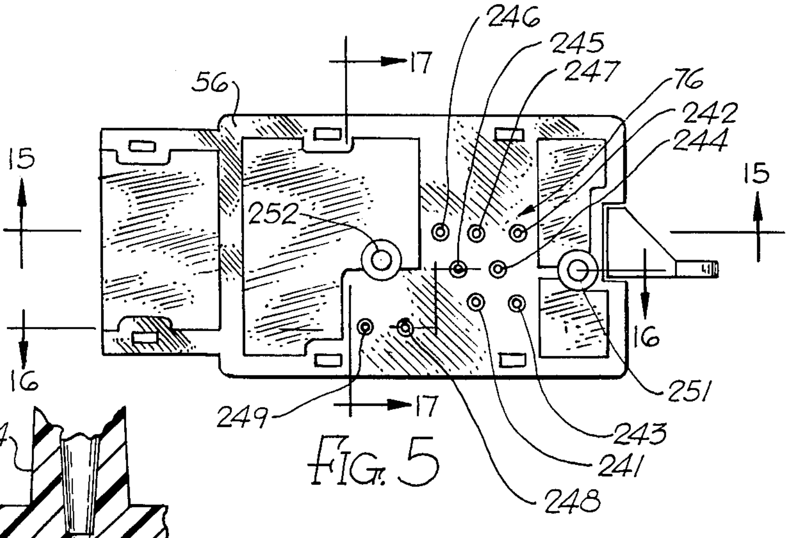

The seven selector valve ports 181–187 and the two temperature valve ports 228 and 229 extend through the rear casing component 54 and connect with the fluid terminal means 76, which may comprise nine nipples or connector tubes 241–249, as shown in FIGS. 1 and 5, adapted to receive a suitable fluid connector. The illustrated nipples 241–249 are formed integrally with the rear casing component 54 and project rearwardly therefrom. Two nipple-shaped locating pins 251 and 252 also project rearwardly from the rear casing component 54 and extend beyond the ends of the nipples 241–249 to assist in locating and guiding the connector, relative to the nipples 241–249.

As shown in FIG. 8, the movable valve members 154 and 200 are preferably retained and covered by a cover plate 254, mounted in a recess 255 in the front side of the rear casing component 54, so as to be flush therewith. The cover plate 254 may be secured to the front casing component 54 by four forwardly projecting tabs or prongs 256, extending through corresponding slots 258. The tabs 256 may be bent or clinched behind the rear casing component 54.

As shown in FIG. 8, the cam follower pins 170 and 216 on the valve members 154 and 200 extend through slots 260 and 262 in the cover plate 254, such slots being sufficiently large to provide for the full range of movement of the cam followers 170 and 216 with the valve members 154 and 200. The illustrated cover plate 254 is also formed with an embossed stiffening rib 264.

As illustrated in FIGS. 11 and 13, the switch 50 is preferably provided with detent means for accurately and definitely locating the function carriage 80 in a plurality of successive positions. In this case, such detent means may comprise a series of notches or recesses 268, formed in the rear side of the function carriage 80, and alternating with detent bumps 270, disposed between the recesses 268. A detent member is resiliently biased into engagement with the detent recesses 268 and bumps 270. Such detent member is illustrated as a ball 272, biased against the carriage 80 by a spring 274, which is illustrated as a compression coil spring. The detent ball 272 and the spring 274 are movably mounted and guided within an opening 276 formed in the rear casing component 54.

It is highly advantageous to align the opening 276 with the locating pin or post 252, so that the opening 276 can extend into the post, as shown in FIG. 13. In this way, the opening can be made amply long to accommodate the ball 272 and the spring 274.

In the illustrated construction, there are seven of the detent recesses 268, establishing seven definite detented positions of the function carriage 80. As the carriage 80 is moved between its positions, the detent bumps 270 cause lateral movement of the detent ball 272. In each of the detented positions of the carriage 80, the switching means and the fluid valve means are operated in a precise and definite manner.

In the illustrated construction, the temperature carriage 82 is not detented. However, detent means for the temperature carriage 82 can be provided, if required, and can have a construction similar to that of the detent means for the function carriage 80.

Figure 20:
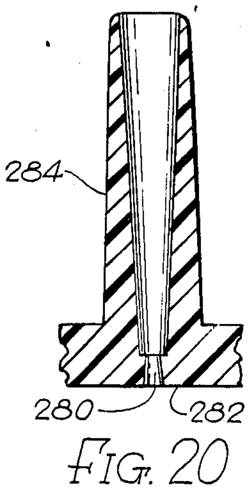
FIGS. 20 and 21 are fragmentary enlarged sectional views, showing modified valve port constructions for the switch, these views being located on the first sheet of drawings, with FIGS. 1—5.
Figure 21:
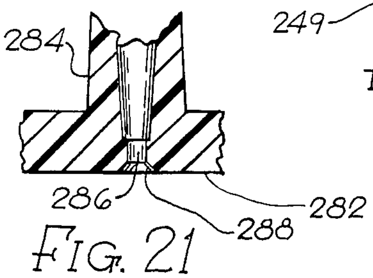

FIGS. 20 and 21 illustrate modified valve port constructions. The previously described valve ports 181–187, 228 and 229, simply comprise small cylindrical holes. FIG. 20 shows a modified valve port 280, extending through a valve wall 282. The port 280 connects with a nipple or connecting tube 284, as before. The modified valve port 280 differs from the previously described valve ports in that the valve port 280 is tapered so that its rear diameter is substantially less than its front diameter. This tapered construction has the advantage that the formation of a burr can be avoided at the intersection between the port 280 and the front surface of the wall 282, when the port 280 is molded or otherwise formed. If any such burr is formed, good workmanship requires that such burr be removed, because any such burr causes wear on the valve sealing member and interferes with the sealing action of such sealing member. In the construction of FIG. 20, the valve port 280 has a gradual taper in a rearward direction.

FIG. 21 shows another modified valve port 286 which has a tapered portion in the form of an annular chamfer 288, disposed at the front end of the port 286, where it intersects with the front side of the valve wall 282. Here again, the formation of the tapered chamfer 288 tends to obviate the formation of any burr at the intersection between the port 286 and the front side of the valve wall 282. The chamfer 288 is more sharply tapered than the gradually tapered port 280 of FIG. 20. Behind the chamfer 288 the port 286 may be cylindrical in shape, as illustrated, or may be gradually tapered.

As shown in FIG. 2, the casing 52 comprises a shroud or enclosure 290 around the electrical terminals 141*a*–144*a*. The shroud 290 comprises wall elements 290*a* and 290*b* of the front and rear casing components 54 and 56. The shroud 290 is adapted to receive the body of a connector which is engageable with the electrical terminals 141*a*–144*a*. As illustrated, the front shroud element 290*a* is formed with a latching tooth or catch 292, adapted to be engaged by a flexible latching arm on the connector.

The electrical terminals 141*a*–144*a* are located and retained in notches or slots 294 formed in the rear edge of a transverse wall element 296, formed across the front shroud component 290*a*. The terminals 141*a*–144*a* are retained in the notches 294 by a transverse wall element 298 on the rear shroud component 290*b*. The walls 296 and 298 are aligned to form the inner boundary of the shroud 290. It will be seen that the shroud 290 is formed with an internal locating groove 300 to receive a ridge on the mating connector, so as to assist in correctly orienting the connector.

FIGS. 39–44 illustrate a modified electrical and fluid control switch 310 which has only one main or operating carriage, taking the form of a function or selector carriage 312, which performs both electrical and fluid control functions. Unlike the switch 50, previously described, the switch 310 does not have a temperature control carriage. The switch 310 is intended particularly for controlling an automative heating and air-conditioning system having automatic temperature control, so that a manually operable temperature control carriage is not needed.

As before, the switch 310 comprises a casing 314 having front and rear components 316 and 318 which snap together. The selector carriage 312 is slidable longitudinally in the casing 314, between the front and rear components 316 and 318.

As before, the selector carriage 312 is adapted to be operated by a lever or some other operating member inserted into the casing 314 through a longitudinal slot 320 in the front wall 322 of the front casing component 316.

As before, the longitudinal slot 320 serves as a guide slot for the selector carriage 312. As in the previously described construction, the carriage 312 is provided with aligned guide flanges or tabs 324 and 326, adapted to be slidably received in the slot 320, with a fairly close sliding fit, so that the carriage 312 will be maintained in alignment with the slot 320. A gap 328 is provided between the guide flanges 324 and 326. A slot 330 extends through the carriage 312 in alignment with the gap 328. As before, the gap 328 and the slot 330 are adapted to receive the external operating lever or other member. To facilitate the entry of the operating lever into the gap 328 and the slot 330, a laterally extending notch or slot 332 is preferably formed in the front wall 322, along one edge of the longitudinal slot 320.

As before, the selector carriage 312 is formed with a plurality of forwardly projecting runners 334, adapted to slide along the inside of the front wall 322 and along the contact elements mounted thereon, as previously described. Four such runners 334 are provided on the illustrated carriage 312.

In order to perform a variety of electrical switching functions, the selector carriage 312 is provided with three electrically conductive contactors 336, 338 and 340. The illustrated contactor 336 has three contact points 336*a*, 336*b* and 336*c* and may be essentially the same as the three-point contactor 120, previously described in connection with FIG. 18. The contactor 338, as shown in FIG. 40, has two contact points 338*a* and 338*b* and may be essentially the same as the two-point contactor 130, previously described in connection with FIG. 19. The contactor 340, as illustrated in FIG. 40, has three contact points 340*a*, 340*b* and 340*c* and may be essentially the same as the previously described three-point contactor 120.

The three contactors 336, 338 and 340 of FIG. 40 may be mounted on the front side of the carriage 312 in the same manner as previously described in connection with the contactors 120 and 130. Moreover, the contactors 336, 338 and 340 may be biased in a forward direction by biasing springs, interposed between the contactors and the carriage 312, in the same manner as previously described.

In the modified switch 310, as shown in FIG. 39, there are six fixed electrical contact elements in the form of bars or strips 341, 342, 343, 344, 345 and 346, mounted on the inside of the front wall 322 and engageable by the movable contactors 336, 338 and 340. The contact bars 341–346 may be riveted or otherwise secured to the front wall 322. It will be seen that the contact bars 341–346 are formed with corresponding terminal lugs or prongs 341*a*–346*a*, adapted to receive a suitable electrical connector.

The first three-point contactor 336 is adapted to close and open an electrical circuit connected between the first and second terminals 341*a* and 342*a*. The illustrated contact bar 341 has an elongated segment 341*b* which is engaged by the contact point 336*a* throughout its range of movement. The contact bar 341 has two laterally projecting segments or wings 341*c* and 341*d* which are spaced apart along the segment 341*b* and are adapted to be engaged by the contact point 336*b* at two different spaced positions along its range of movement. At its extreme right hand end, the contact bar 341 is provided with a wing or segment 341*e* which projects laterally from the right hand portion of the segment 341*b* and is engageable by the third contact point 336*c*.

The second contact bar 342 has two spaced segments 342*b* and 342*c* which are engageable by the contact point 336*b*. It will be seen that the segment 341*c* projects into the space between the segments 342*b* and 342*c*. The segment 342*c* projects into the space between the segments 341*c* and 341*d*.

The fixed contact bar 342 also has spaced segments 342*d* and 342*e* which are engageable by the third contact point 336*c*. A notch or cutout 342*f* is formed in the contact bar 342 between the segments 342*d* and 342*e*. As shown, the cutout 342*f* is generally semicircular in shape. Within the cutout 342*f*, a raised insulating boss 342*g* is preferably formed on the inside of the front wall 322, to assist in the smooth passage of the contact point 336*c* across the cutout 342*f*, and to keep electrical arcing away from the front wall 322.

In FIG. 39, the first three-point contactor 336 is shown in broken lines in its first OFF position, in which the contact point 336*b* engages the segment 341*c*, while the contact point 336*c* engages the insulating boss 342*g*. The contactor 336 is movable to the left, by movement of the selector carriage 312, to an ON position, in which the contact point 336*b* engages the segment 342*b*, while the contact point 336*c* simultaneously engages the segment 342*d*. As before, this construction results in a double break, when the contactor 336 is moved out of engagement with the segments 342*b* and 342*d*, as the contactor is again moved to its OFF position, as shown in broken lines in FIG. 39. The simultaneous double break distributes the arcing and the wear between the contact points 336*b* and 336*c*.

The contactor 336 is movable to the right from its OFF position in FIG. 39 to another ON position, in which the contact points 336*b* and 336*c* simultaneously engage the segments 342*c* and 342*e*. Here again, there is a double make and break action which distributes the arcing and the wear between the contact points 336*b* and 336*c*.

When the first contactor 336 is moved still farther to the right in FIG. 39, the contact points 336*b* and 336*c* engage the segments 341*d* and 341*e*, so that the circuit between the contact bars 341 and 342 is again opened. Here again, there is a double simultaneous break, which distributes the arcing and the wear between the contact points 336*b* and 336*c*. This extreme right hand position of the contactor 336 constitutes a second OFF position.

The two-point contactor 338 is adapted to control the opening and closing of an electrical circuit between the third and fourth contact bars 343 and 344. It will be seen from FIG. 39 that the contact point 338*b* engages the contact bar 344 throughout the range of travel of the contactor 338. On the other hand, the contact bar 343 has two spaced segments 343*b* and 343*c* which are engageable by the contact point 338*a*.

In FIG. 39, the two-point contactor 338 is shown in broken lines in one of its OFF positions, in which the contact point 338*a* engages a raised insulating boss 343*d*, which is preferably provided on the inside of the front wall 322, in the space between the segments 343*b* and 343*c*. The contactor 338 is movable to the left to an ON position, in which the contact point 338*a* engages the contact segment 343*b*. The contactor 338 is also movable to the right to another ON position, in which the contact point 338*a* engages the contact segment 343*c*. Further movement of the selector carriage 312 to the right will move the contactor 338 to another OFF position, in which the contact point 338*a* will be moved beyond the right hand end of the segment 343*c*. In this position, a raised insulating boss 343*e* is preferably provided on the inside of the front wall 322. Both of the insulating bosses 343*d* and 343*e* project from the front wall 322 by an amount corresponding to the thickness of the contact bar 343, to provide for smooth movement of the contact point 338*a*, and to keep electrical arcing away from the inner surface of the insulating front wall 322.

The second three-point contactor 340 controls the opening and closing of an electrical circuit between the contact bars 345 and 346. It will be seen from FIG. 39 that the contact point 340*c* engages an elongated segment 346*b* of the contact bar 346 throughout the range of movement of the contactor 340, as it is moved by the carriage 312. The contact point 340*a* is engageable with an elongated segment 345*b* of the contact bar 345, except in the extreme right hand position of the contactor 340, in which the contact point 340*a* is engageable with a laterally projecting contact segment or wing 346*c* on the contact bar 346. In such extreme right hand position of the contactor 340, the contact point 340*b* engages a laterally projecting segment or wing 346*d* on the contact bar 346. Thus, such extreme right hand position is an OFF position of the contactor 340. From such OFF position, the contactor 340 is movable to the left, to bring the contact point 340*a* into engagement with the segment 345*b*, while the contact point 340*b* is simultaneously engageable with a laterally projecting segment 345*d* of the contact bar 345. This double make results in a double break when the contactor 340 is moved out of engagement with the segments 345*b* and 345*d*, as the contactor 340 is moved to its extreme right hand OFF position. As before, the double break construction results in distribution of electrical arcing and wear between the contact points 340*a* and 340*b*.

The runners 334 on the carriage 312 are slidable along the first and sixth contact bars 341 and 346, and also along rails or ribs 350 and 352, projecting from the inside of the front wall 322 by an amount corresponding to the thickness of the contact bars 341 and 346. The insulating rails 350 and 352 constitute mechanical extensions of the conductive contact bars 341 and 346.

As before, the movement of the selector carriage 312 along the length of the casing 314 is also adapted to carry out fluid control functions. For this purpose, the switch 310 includes vacuum control valve means 354, including a movable vacuum valve member 356, slidable transversely in a valve slideway or or chamber 358, as shown in FIGS. 41–44. The construction of the vacuum valve means 354 is generally very much the same as previously described in connection with FIGS. 8–12.

As shown in FIGS. 41 and 43, the vacuum valve member 356 is formed with a cam follower pin 360 which protects forwardly through a slot 362 in a cover plate 364, adapted to retain the vacuum valve member 356 in the valve chamber 358. The cover plate 364 is preferably set into a recess 366, so as to be flush with the front side of the rear wall 368. As before, the cover plate 364 may be secured to the rear wall 368 by tabs or prongs 370 which extend through slots 372 in the rear wall 368.

The valve chamber 358 has a rear wall 376 which is formed with seven valve ports 381–387, arranged in the same pattern as before, but numbered in a different sequence. The ports 381–387 are connected to rearwardly projecting nipples 381*a*–387*a*, adapted to receive a suitable fluid connector, whereby a vacuum source and vacuum utilization devices may be connected to the ports.

The cam follower 360 on the vacuum valve member 356 is operable by a cam groove or track 390, formed in the rear side of the selector carriage 312, as shown in FIG. 44. The cam groove 390 is generally similar to the cam groove 172, previously described in connection with FIG. 11.

Figure 42:
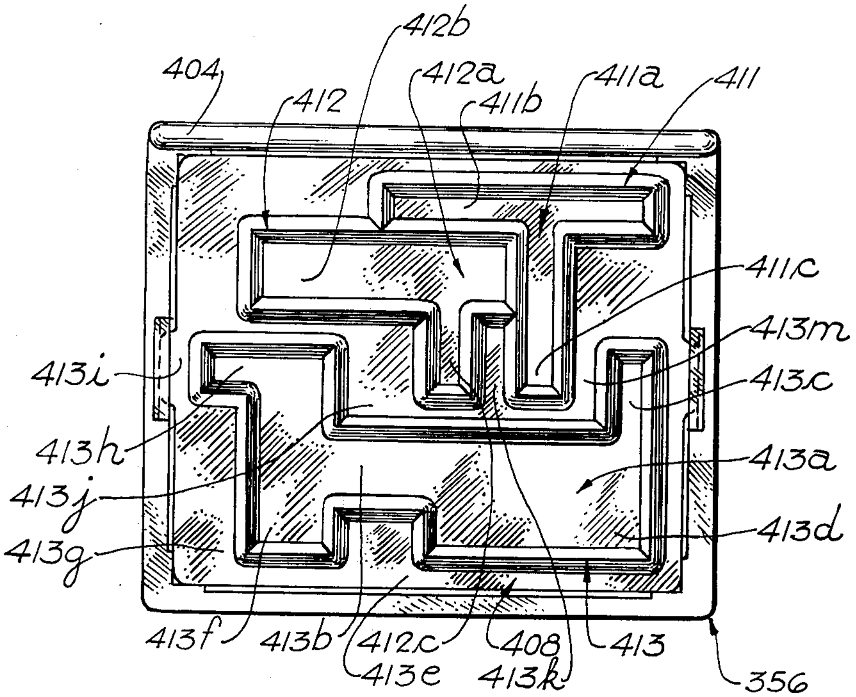
FIG. 42 is an enlarged rear view of the valve sealing member for the modified switch.

As before, the selector carriage 312 is adapted to be precisely located in a series of operating positions by detent means, preferably comprising a series of detent recesses or notches 392 in the rear side of the selector carriage 312. As shown in FIG. 44, there are six of the detent recesses 392. Detent bumps 394 are provided between the recesses 392. In the illustrated construction, the alternating detent recesses 392 and bumps 394 are engageable by a detent element in the form of a ball 396, guided for transverse movement in an opening 398 formed in the rear casing component 318, as illustrated in FIG. 42. A resilient biasing spring 400 is preferably mounted in the opening 398 behind the detent ball 396, to bias the detent ball in a forward direction against the alternating detent recesses 392 and bumps 394. The spring 400 is indicated in FIG. 41.

Additional details of the vacuum valve member 356 are shown in FIG. 42. The valve member 356 is generally quite similar to the previously described valve member of FIGS. 22–30. As before, the valve member 356 is formed with a guide flange 404 which is slidably received in a guide groove 406, formed along one edge of the valve chamber 358. The vacuum valve member 356 carries a valve sealing member 408, made of soft resilient material, such as silicone rubber. As before, the valve sealing member 408 is resiliently biased into sealing engagement with the valve surface 376, through which the ports 381–387 are formed.

In the construction of FIG. 42, the valve sealing member 408 comprises three rearwardly projecting enclosure dams or ridges 411, 412 and 413, adapted to control the communication to and from the ports 381–387, and between the ports and the atmosphere.

As shown in FIG. 41, the first enclosure dam 411 encloses a chamber 411*a* having a portion 411*b* which includes the port 385 in all positions of the vacuum valve member 356, throughout its range of movement. The chamber 411*a* has a transverse portion 411*c* which includes the port 381 in one position of the vacuum valve member 356.

The second enclosure dam 412 encloses a chamber 412*a* having a longitudinal portion 412*b* which includes the port 386 throughout the range of movement of the valve member 356. The chamber 412*a* has a laterally extending portion 412*c* which includes the port 381 in one position of the vacuum valve member 356.

The third enclosure dam 413 encloses a chamber 413*a* having a longitudinal portion 413*b* which includes the port 387 throughout the range of movement of the vacuum valve member 356. The chamber 413*a* has a laterally projecting portion 413*c* which includes the port 381 in one position of the vacuum valve member 356. The chamber 413*a* has another laterally projecting portion or segment 413*d* which includes the port 384 in all but one position of the valve member 356. In such one position, the port 384 is opposite a zone 413*e* which is outside the dam 413 and is vented to the atmosphere.

The chamber 413*a* has another laterally projecting portion 413*f* which includes the port 383 in two adjacent positions of the valve member 356. In all other positions, the port 383 is opposite the zone 431*e* and another zone 413*g* which are outside the dam 413 and are vented to the atmosphere.

The chamber 413*a* has still another laterally offset portion 413*h* which includes the port 382 in three adjacent positions of the vacuum valve member 356. In other positions of the valve member 356, the port 382 is opposite zones 413*i* and 413*j* which are outside the dam 413 and are vented to the atmosphere.

The first port 381 is opposite a portion of the venting zone 413*j* in one extreme position of the valve member 356. In the next position, the port 381 is included in the chamber 412*c*, as previously mentioned. In the next position, the port 381 is opposite a venting zone 413*k*, outside the dams 411, 412 and 413. In the next position, the port 381 is opposite the chamber 411*c*, as previously mentioned. In the next position, the port 381 is opposite a venting zone 413*m*, which is outside the dams 411, 412 and 413. In the next and final position of the valve member 356, the port 381 is included in the chamber portion 413*c* as previously mentioned.

Except as otherwise described, the modified switch 310 may be the same as the switch 50 of FIGS. 1–38.

We claim:

1. A vacuum valve, comprising
a valve body having a flat wall with a vacuum supply port and a vacuum utilization port therein,
means for connecting a source of vacuum to said vacuum supply port,
means for connecting a utilization device to said vacuum utilization port,
a valve plate movable along said wall,
and means guiding said valve plate for movement along a predetermined path along said wall between first and second positions,
said valve plate having a soft resilient sealing member thereon slidably engaging said wall,
said sealing member having a first sealing enclosure dam in slidable sealing engagement with said wall and enclosing said vacuum supply port throughout the range of movement of said valve plate,
said first sealing enclosure dam being in the form of a first perimeter ridge having a closed perimeter and forming a first closed space between said valve plate and said wall,
said space having a first portion opposite said vacuum supply port throughout the range of movement of said valve plate,
said first portion having a width greater than the range of movement of said valve plate,
said vacuum utilization port being outside said first sealing enclosure dam and being open to the atmosphere when said valve member is in said first position,
said first sealing enclosure dam being movable with said valve plate to enclose said vacuum utilization port as well as said vacuum supply port to establish communication between said ports when said valve plate is in said second position,
said space within said first sealing enclosure dam having a second portion with a reduced width relative to the width of said first portion,
said second portion being in communication with said vacuum utilization port when said valve plate is in said second position,
said valve plate having an intermediate transitional position between said first and second positions,
said first perimeter ridge having a ridge portion which moves over and past said vacuum utilization port when said valve plate is moved between said second position and said intermediate position,
said sealing member having a second sealing enclosure dam in the form of a second closed perimeter ridge in slidable sealing engagement with said wall and enclosing said vacuum utilization port when said valve plate is in said intermediate position,
said ridge portion being a common portion of said second perimeter ridge as well as said first perimeter ridge,
whereby said second sealing enclosure dam prevents any leakage between the atmosphere and said vacuum supply port when said ridge portion is moved over and past said vacuum utilization port so that leakage between the atmosphere and said vacuum supply port is prevented throughout the range of movement of said valve plate.

* * * * *